US012112354B1

(12) United States Patent
Bathen et al.

(10) Patent No.: US 12,112,354 B1
(45) Date of Patent: Oct. 8, 2024

(54) ELECTRONIC MARKETPLACE FOR DIGITAL ADVERTISING SPACE

(71) Applicant: International Business Machines Corporation, Armonk, NY (US)

(72) Inventors: Luis Angel Bathen, San Jose, CA (US); Marc Henri Coq, Hopewell Junction, NY (US); Eric Kevin Butler, San Jose, CA (US); Akil Khamisi Sutton, Poughkeepsie, NY (US); Sandra C. Thompson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/337,509

(22) Filed: Jun. 20, 2023

(51) Int. Cl.
G06Q 30/02 (2023.01)
G06Q 30/0201 (2023.01)
G06Q 30/0273 (2023.01)

(52) U.S. Cl.
CPC ..... *G06Q 30/0275* (2013.01); *G06Q 30/0206* (2013.01); *G06Q 2220/00* (2013.01)

(58) Field of Classification Search
CPC ........... G06Q 30/0206; G06Q 2220/00; G06Q 30/0207–30/0277
See application file for complete search history.

(56) References Cited

U.S. PATENT DOCUMENTS

| | | | |
|---|---|---|---|
| 6,505,169 B1 | 1/2003 | Bhagavath | |
| 7,363,254 B2 | 4/2008 | Skinner | |
| 8,831,987 B2 | 9/2014 | Knapp | |
| 10,327,026 B1* | 6/2019 | Mishra | H04N 21/2668 |
| 10,462,504 B2 | 10/2019 | Lopatecki | |
| 10,856,022 B2 | 12/2020 | Bapna | |
| 11,037,228 B1 | 6/2021 | Griggs | |
| 11,080,762 B1 | 8/2021 | Amini | |
| 11,284,130 B2 | 3/2022 | Weiner | |
| 11,367,060 B1 | 6/2022 | Barbashin | |
| 2008/0066107 A1 | 3/2008 | Moonka | |
| 2008/0319860 A1* | 12/2008 | Hinkis | G06Q 30/08 705/14.71 |

(Continued)

OTHER PUBLICATIONS

Dogtiev, "Real Time Bidding Advertising Networks", Business of Apps, Apr. 4, 2023, 4 pages, https://www.businessofapps.com/ads/real-time-bidding-rtb/.

(Continued)

*Primary Examiner* — Thuy N Nguyen
(74) *Attorney, Agent, or Firm* — Michael A. Petrocelli

(57) ABSTRACT

Techniques are disclosed, using one or more computers. for bidding on digital advertising space associated with media content on a digital platform. Popularity is determined of a plurality of electronic communication and associated clips on a digital platform. A clip is detected which meets a threshold for approaching an activity level of user activity indicating the popularity of the clip. The clip meeting the threshold is labeled as a non-fungible token (NFT) indicating available digital advertising space associated with the clip. In response to the labeling of the clip, monetary bidding is received, based on the NFT by entities buying digital advertising space for digital advertising content associated with the NFT.

19 Claims, 5 Drawing Sheets

(56) References Cited

U.S. PATENT DOCUMENTS

| | | | | |
|---|---|---|---|---|
| 2009/0112749 | A1* | 4/2009 | Monteverde | G06Q 30/08 705/37 |
| 2009/0199230 | A1* | 8/2009 | Kumar | G06Q 30/0268 725/32 |
| 2013/0124308 | A1 | 5/2013 | Hegeman | |
| 2016/0007098 | A1* | 1/2016 | Southam | H04N 21/84 725/32 |
| 2017/0171627 | A1* | 6/2017 | Cang | H04L 67/55 |
| 2017/0193564 | A1 | 7/2017 | Young-Lai | |
| 2017/0213243 | A1* | 7/2017 | Dollard | G06Q 30/0249 |
| 2017/0358009 | A1 | 12/2017 | Shah | |
| 2019/0279289 | A1 | 9/2019 | Baluja | |
| 2023/0075884 | A1* | 3/2023 | Jakobsson | H04L 9/50 |
| 2023/0117801 | A1* | 4/2023 | Quigley | G06Q 20/085 705/65 |
| 2023/0118312 | A1* | 4/2023 | Sun | G06Q 20/389 705/69 |
| 2023/0281705 | A1* | 9/2023 | Aviv | G06Q 30/0601 705/26.3 |
| 2023/0297345 | A1* | 9/2023 | Khalfan | G06F 21/64 717/107 |
| 2023/0343368 | A1* | 10/2023 | Zhuang | G11B 27/031 |
| 2023/0377056 | A1* | 11/2023 | Yang | A63F 13/67 |
| 2023/0410066 | A1* | 12/2023 | Khalfan | G06Q 20/065 |
| 2024/0070235 | A1* | 2/2024 | Kline | G06V 10/25 |

OTHER PUBLICATIONS

GMI Blogger, "YouTube Statistics 2023", [Users by Country + Demographics], globalmediainsight.com, Feb. 27, 2023, 25 pages.

InMobi, "Best Mobile In-App Ad Creative Platform", Accessed Apr. 7, 2023, 9 pages, https://www.inmobi.com/exchange.

Smaato.com, "Solving Complexity with Simplicity", Digital Ad Tech and Monetization Platform, Accessed Apr. 7, 2023, 7 pages, https://www.smaato.com/.

Wyatt, "2020 is YouTube Gaming's biggest year, ever: 100B watch time hours", YouTube Blog, Dec. 8, 2020, 9 pages.

* cited by examiner

ELECTRONIC MARKETPLACE FOR DIGITAL ADVERTISING SPACE

BACKGROUND

The present disclosure relates to accessing and marketing digital advertising space on a digital platform, and more specifically, relating to a digital platform for audiovisual recordings, and/or audio recordings (e.g., music platform), and/or video with or without audio.

One example of current techniques for accessing and marketing digital advertising space can include a system which charges an amount or a budget to an entity for an individual campaign, for example, an advertising campaign. A daily limit can be set for how much the entity intends to spend per day. A maximum cost-per-click bid (max CPC bid) can be set to the most an entity is willing to pay. Clicks can represent using a mouse to click on a link for a video or video clip. Typically, higher bidding reflects more clicks registered and/or more likely for a link to get clicks.

In one example, a campaign is a set of advertising groups that share a budget. The campaign can be for a certain location, language based, and budget controlled. Spending can be controlled and maintained on a per month basis. Advertising placement can be based on keywords/topics. Also, advertising can target specific websites/channels, and can be designed as a placement. Bids can be increased on targeted websites/channels based on an entity's preference. Thereby, clients can set preferences for bidding, and a system or system algorithm can determine bidding limits, time and other preferences, and bill a client accordingly. The current bidding process for advertising is a static process based on user preferences.

SUMMARY

The present disclosure recognizes the shortcomings and problems associated with current techniques for accessing and marketing digital advertising space on a digital platform, for example, a digital video platform which can include audiovisual, video, or audio, alone or in combination. Embodiments of the present invention provide techniques for marketing digital advertising space on a digital video platform, and more specifically, to marketing digital advertising space related to a video on a digital video platform. The marketing can use bidding based on detected popularity of a video clip associated with a video.

In one example, in current advertising bidding techniques, an entity or client who is bidding on advertising does not have transparency as to the content their ad will be associated with, e.g., placed next to or concurrently with. Also, currently, a user, client, or entity bidding on advertising space is not able to select content to associate their advertising with, for example, place next to, or display concurrently, on a webpage or on streaming video, or as part of a video clip. Further, currently, a client does not have transparency in the bidding process so as to know a price the bidding is at and the ability to bid more or change bidding parameters in the bidding process.

In an aspect according to the present invention, a computer-implemented method for bidding on digital advertising space associated with media content on a digital platform includes determining, using a computer, popularity of a plurality of electronic communications and associated clips of the electronic communications on a digital platform, in response to monitoring the digital platform. The method includes detecting, using the computer, a clip of the associated clips meeting a threshold for approaching an activity level of user activity indicating the popularity of the clip. The method includes labeling, using the computer, the clip meeting the threshold with a non-fungible token (NFT) indicating available digital advertising space associated with the clip. The method includes receiving, in response to the labeling of the video clip, monetary bidding based on the NFT by entities buying digital advertising space for digital advertising content associated with the NFT.

In a related aspect, the method can further includes awarding the digital advertising space associated with the clip to a highest bidder of the entities bidding on the digital advertising space.

In a related aspect, the detecting can include monitoring traffic of a digital stream with respect to each of the clips.

In a related aspect, the detecting can include monitoring views by users of the clips, respectively, for determining the activity level of the user activity.

In a related aspect, the detecting including monitoring on-line digital chat windows for determining the activity level of the user activity regarding the video clips, respectively.

In a related aspect, the determining of the activity level can include the detecting of comments or selections of a link, by users, with respect to one of the clips.

In a related aspect, the method can further include defining ownership of the digital advertising space using the NFT.

In a related aspect, the method can further include defining ownership of the digital advertising space using the NFT; awarding the digital advertising space associated with the clip to a highest bidder of the entities bidding on the digital advertising space; and transferring ownership, using the NFT, of the digital advertising space to the highest bidder.

In a related aspect, the method can further include defining ownership of the digital advertising space and the associated clip using the NFT; awarding the digital advertising space and the associated clip to a highest bidder of the entities bidding on the digital advertising space; and transferring ownership, using the NFT, of the digital advertising space and the associated clip to the highest bidder.

In a related aspect, the electronic communications are videos with or without audio, or audio recordings.

In a related aspect, the electronic communications are videos with or without audio, or audio recordings, and the associated clips are associated video clips, or associated audio clips.

In a related aspect, the digital platform includes a digital video and audio platform.

In another aspect according to the present invention, a system for bidding on digital advertising space associated with media content on a digital platform includes a computer system. The computer system includes; a computer processor, a computer-readable storage medium, and program instructions stored on the computer-readable storage medium being executable by the processor, to cause the computer system to perform the following functions to; determine, using a computer, popularity of a plurality of electronic communications and associated clips of the electronic communication on a digital platform, in response to monitoring the digital platform; detect, using the computer, a clip of the associated clips meeting a threshold for approaching an activity level of user activity indicating the popularity of the clip; label, using the computer, the clip meeting the threshold with a non-fungible token (NFT) indicating available digital advertising space associated with the clip; and receive, in response to the labeling of the clip, monetary bidding based on the NFT by entities buying digital advertising space for digital advertising content associated with the NFT.

In a related aspect, the system further includes the function to award the digital advertising space associated with the video clip to a highest bidder of the entities bidding on the digital advertising space.

In a related aspect, the detection includes monitoring traffic of a digital stream with respect to each of the video clips.

In a related aspect, the detection includes monitoring views by users of the video clips, respectively, for determining the activity level of the user activity.

In a related aspect, the detection includes monitoring on-line digital chat windows for determining the activity level of the user activity regarding the video clips, respectively.

In a related aspect, the determination of the activity level includes the detecting of comments or selections of a link, by users, with respect to one of the video clips.

In a related aspect, the system further includes the function to define ownership of the digital advertising space using the NFT.

In another aspect according to the present invention, a computer program product for bidding on digital advertising space associated with media content on a digital platform includes a computer readable storage medium having program instructions embodied therewith. The program instructions being executable by a computer to cause the computer to perform functions, by the computer, comprising the functions to; determine, using a computer, popularity of a plurality of electronic communication and associated clips of the electronic communication on a digital platform, in response to monitoring the digital platform; detect, using the computer, a clip of the associated clips meeting a threshold for approaching an activity level of user activity indicating the popularity of the clip; label, using the computer, the clip meeting the threshold with a non-fungible token (NFT) indicating available digital advertising space associated with the clip; and receive, in response to the labeling of the clip, monetary bidding based on the NFT by entities buying digital advertising space for digital advertising content associated with the NFT.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Figure 1:
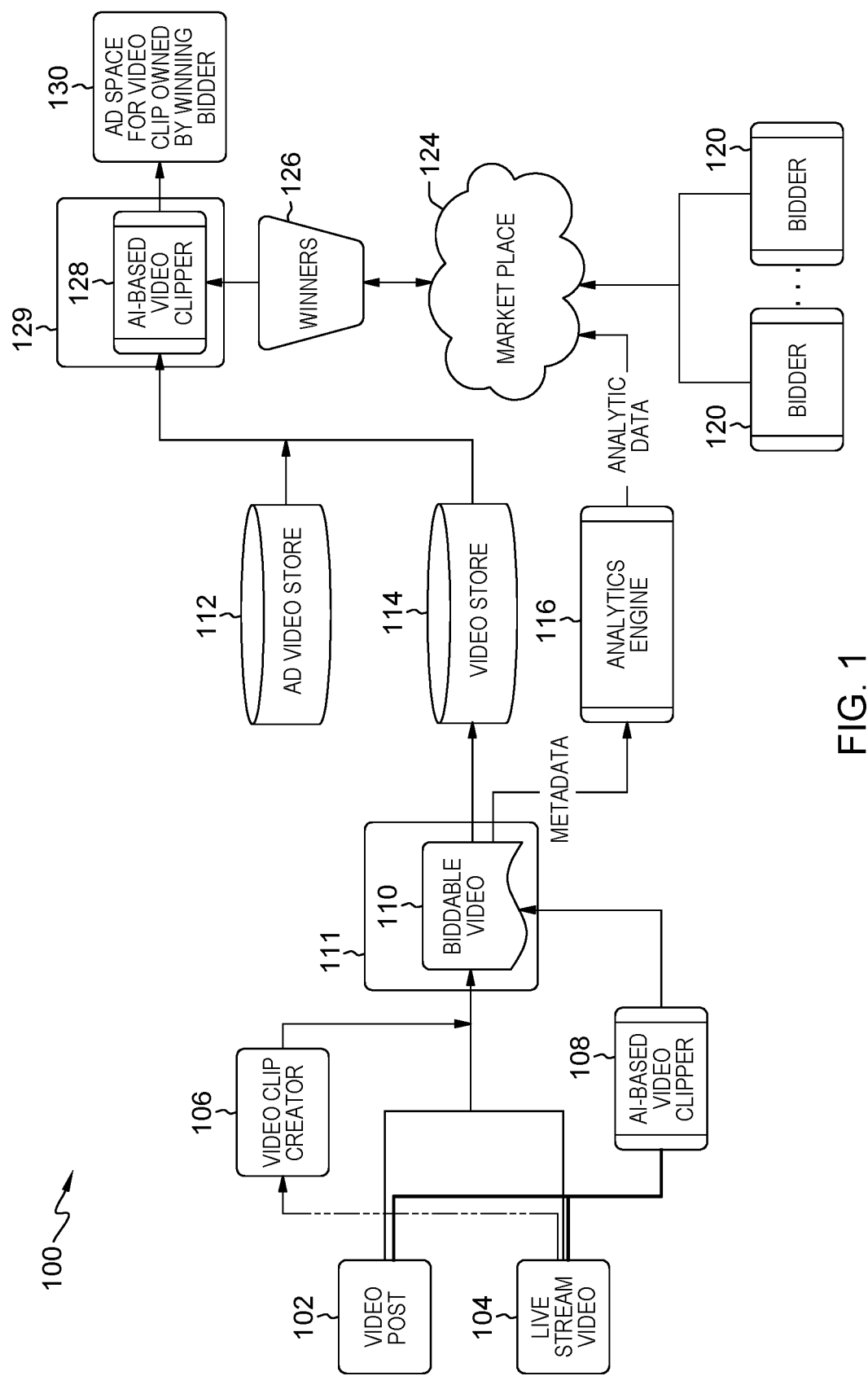
FIG. 1 is a schematic block diagram illustrating a system for bidding on digital advertising space associated with media content on a digital video platform according to an embodiment of the present disclosure.

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments and Examples

Embodiments and figures of the present disclosure may have the same or similar components as other embodiments. Such figures and descriptions illustrate and explain further examples and embodiments according to the present disclosure. Embodiments of the present disclosure can include operational actions and/or procedures. A method, such as a computer-implemented method, can include a series of operational blocks for implementing an embodiment according to the present disclosure which can include cooperation with one or more systems shown in the figures. The operational blocks of the methods and systems according to the present disclosure can include techniques, mechanism, modules, and the like for implementing the functions of the operations in accordance with the present disclosure. Similar components may have the same reference numerals. Components can operate in concert with a computer implemented method.

It is understood that a customer can be an individual, or a group of individuals, or a company or an organization. It is also understood, for example, that videos as referenced herein can refer to audiovisual recording including both audio (i.e., sound) and video (i.e., visual) components. In another example, electronic communication as understood herein can include videos, with or without audio, audio recordings, or other electronic communications, whether originally recorded or as included in an electronic communication such as an email, post, or repost, or as part of another electronic message. It is further understood that as referred to herein, a digital platform can include digital video platforms, a music platform which would include an audio platform, and/or other similar platforms whether in combination, or in all or in part.

Figure 2:
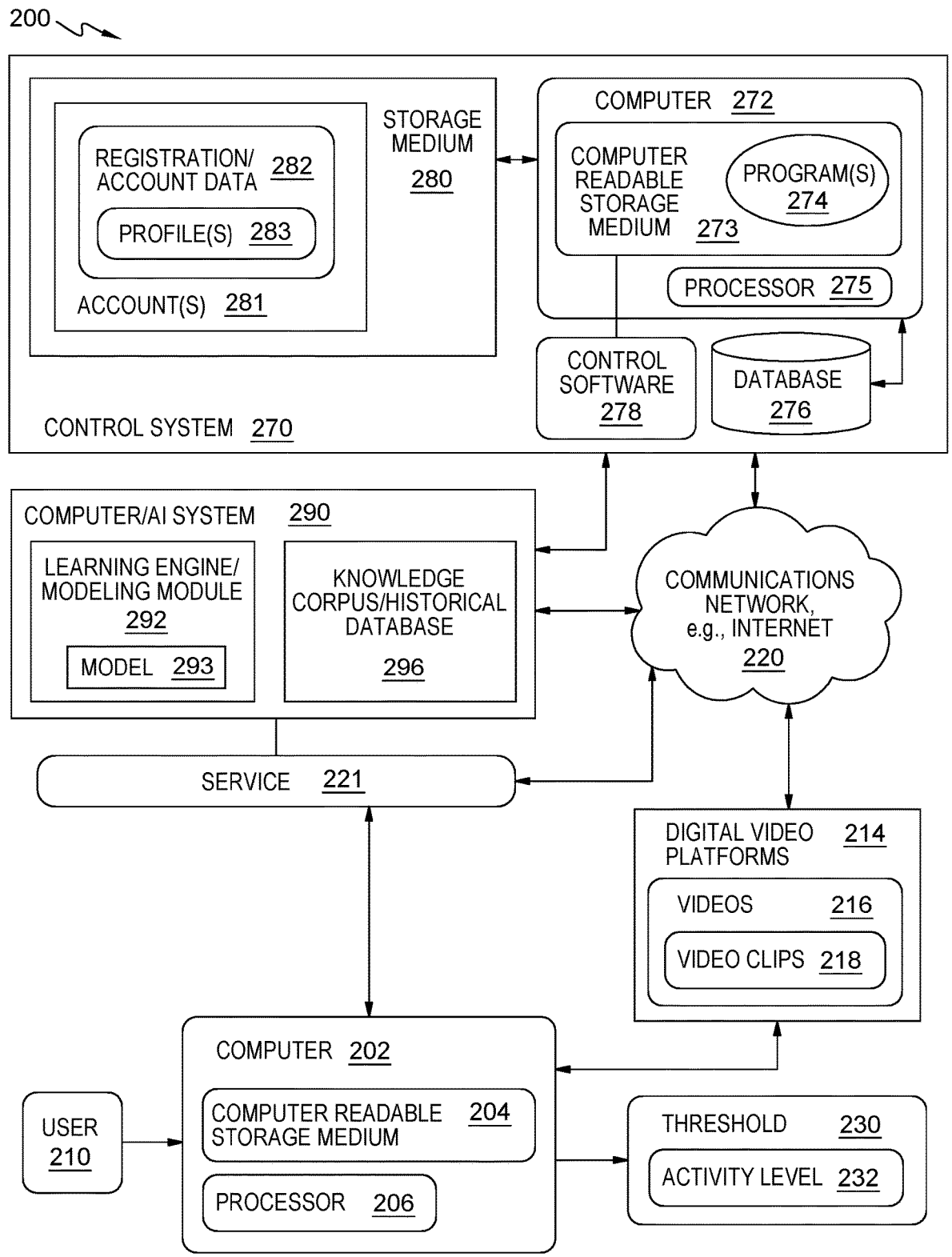
FIG. 2 is a schematic block diagram of a system, according to another embodiment of the present disclosure, for bidding on digital advertising space associated with media content on a digital video platform.

Referring to FIGS. 1 and 2, according to an embodiment of the present disclosure, a computer implemented system 100 is used for bidding on digital advertising space associated with media content on a digital video platform.

Content creators can generate content that may unintentionally go viral. Sometimes, videos are clipped by individuals and posted on various platforms outside of the creator's control. Video clips can go viral, which do not include the full video. Embodiments of the present disclosure can predict virality of a specific video clip, and let entities (e.g., companies) bid for the ad (advertising) space. Embodiments according to the present disclosure can predict or monitor videos for a clip/section which could go viral. Video virality can be considered a tunable parameter. The acceleration of users/views per second metric can be used to predict when and/or if a video clip will go viral. In one example, a bot can monitor views per second on a video's time frame, traffic on a stream, or number of views and the acceleration on a stream's time frame. In real-time, when the acceleration reaches some threshold, the video can be clipped, creating a potentially viral clip. Chat windows on streams or videos can be analyzed and a computation can predict a probability of a video going viral. Sentiment analysis can be done to generate metrics that dictate a type of video. In one example, users selecting a video (e.g., clicking on a video or video link) on a digital platform initiate opening/playing the video which is counted or quantified and is used in determining when a video reaches or approaches viral status. For example, the more clicks the more valuable the digital real estate around or associated with the video because of the amount of viewership increases proportionally with the amount of clicks. Viral, for example, can include quantifying an amount of activity or viewing (e.g., clicks by users playing the video) and defining an amount of activity (i.e., popularity) considered viral. In another example, the amount of activity can include a total amount of viewing/clicks, and/or an amount of clicks over a time period, or in other words, how long it took to receive an "N" number of views or clicks, or how many views were received in a defined period of time.

Referring to FIG. 1, the system 100 includes a content creator that can create and post a video, as in operation 102. Another or the same content creator can create and post a live video stream, as in operation 104. A video clip creator can generate video clips as in operation 106. In one example, an artificial Intelligence (AI) based video clipper can generate video clips as in operation 108. A created video clip can be presented as a biddable video 110. In one example, an AI function using software programming on a computer, such as a bot, can be used monitor content and generate metrics for a biddable video based on video streaming details and video content. For example, the AI can leverage video analytics and sentiment analysis of chatlogs.

The biddable video 110 can be minted as a nonfungible token (NFT) 111. The NFT 111 can have rules that establish ownership and rules for ownership transfer including royalties. For example, a content creator can profit from a viral video rather than an entity that re-posts the content.

The system 100 includes metadata as input into an analytics engine 116. A video store 114 can receive the biddable video 110. An ad video store 112 can store and provide ad space associated with video clips, respectively. A marketplace 124 for bidding can be electronically accessed by bidders 120. The bidders can engage in informed bidding as the biddable video is represented as an NFT and the bidding can be transparent. The winning 126 bidders 120 for ad space can be saved, and an AI based video clipper 128 can be used to finalize, e.g., transfer the NFT ownership 129, of the ad space which is associated to the biddable video 110 video clip from the ad video store 112, to the winning bidder. The ad space for the video clip is owned by the winning bidder, as in operation 130.

It is understood that transfer of ownership of the NFT does not exclude other payment for a winning bidder, for example, payments as in residuals or royalties, or payments based on amount or frequency of traffic of a clip or video clip. In another example, a transfer of ownership of an NFT can include partial ownership, or partial ownership combined with payments, or various ownership and payment schemes over a period of time.

The system 100 provides transparency and immediate virality metrics for informed bidding. Once the biddable video is generated, it can go into the marketplace (which can be decentralized). Users can bid based on metrics provided by the system (for example, demographics of users watching the video live, virality factor, for example, a video clip approaching a viral level, a location, etc.). Video ad space ownership can be transferred to a new owner. Ad space can be treated as an NFT. Royalties can be provided to a biddable video creator or a winning bidder. Ownership can be transferred between parties. For example, a video which goes viral in a first country, and an entity bids because its demographic is in the first country. If the video virality goes down in the first country, but goes viral in a second country, ad space can be transferred to the second country.

Thereby, embodiments of the present disclosure can enable content creators to receive profit from ads via minting of a viral videos as NFTs. In one example, a policy can pay royalties based on views/clicks tracked through a blockchain. In one example, every time the video is played, it is recorded in a ledger for receiving royalties. In one example, brands can create payment pools used for bidding, and funds can be verified in real-time. Any entity can join the ecosystem represented by the system 100 and bid/pay for viral videos.

Other Embodiments and Examples

Figure 3:
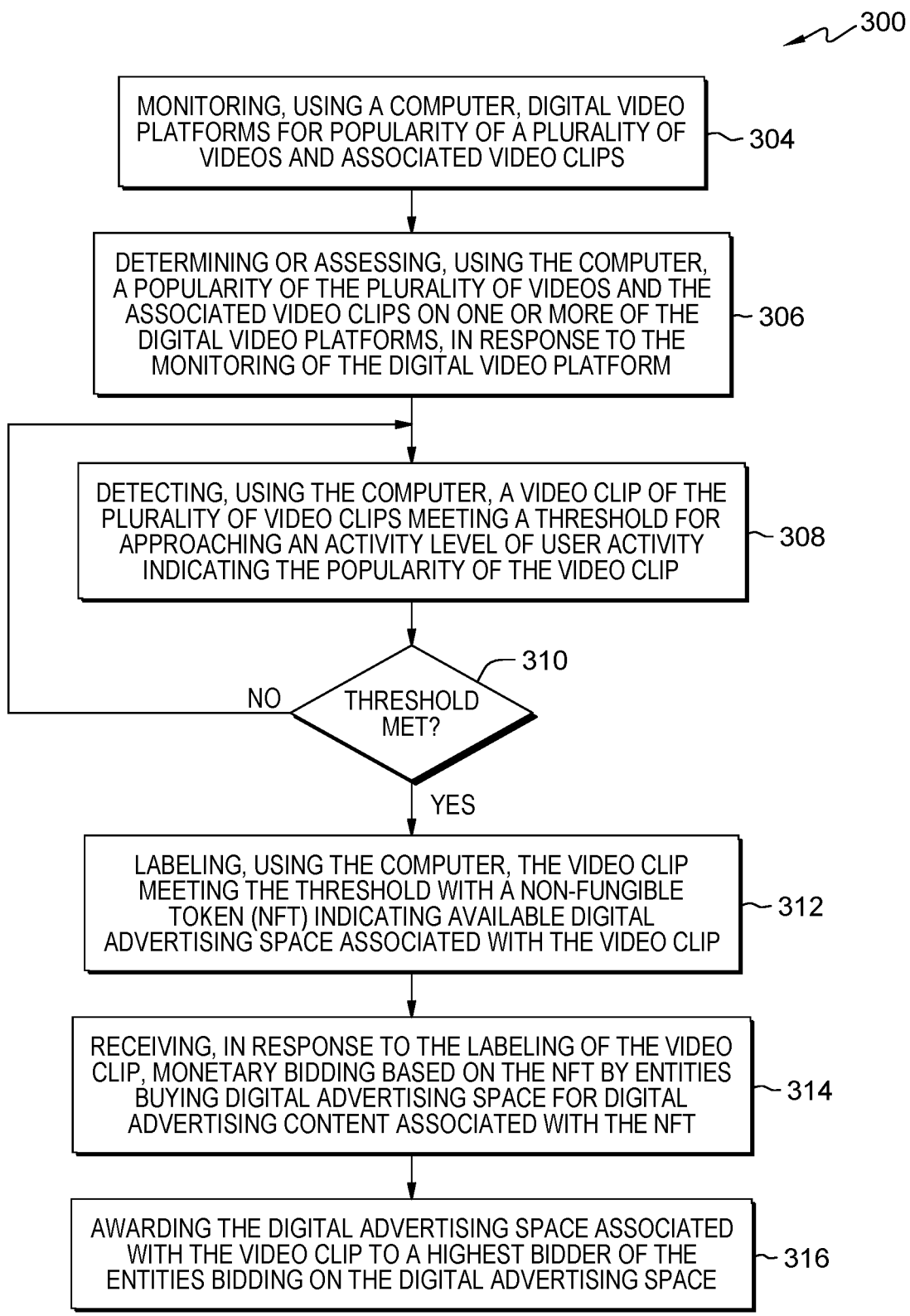
FIG. 3 is a flow chart of a method, according to an embodiment of the present disclosure, which can use the system depicted in FIG. 2, for bidding on digital advertising space associated with media content on a digital video platform.
Figure 5:
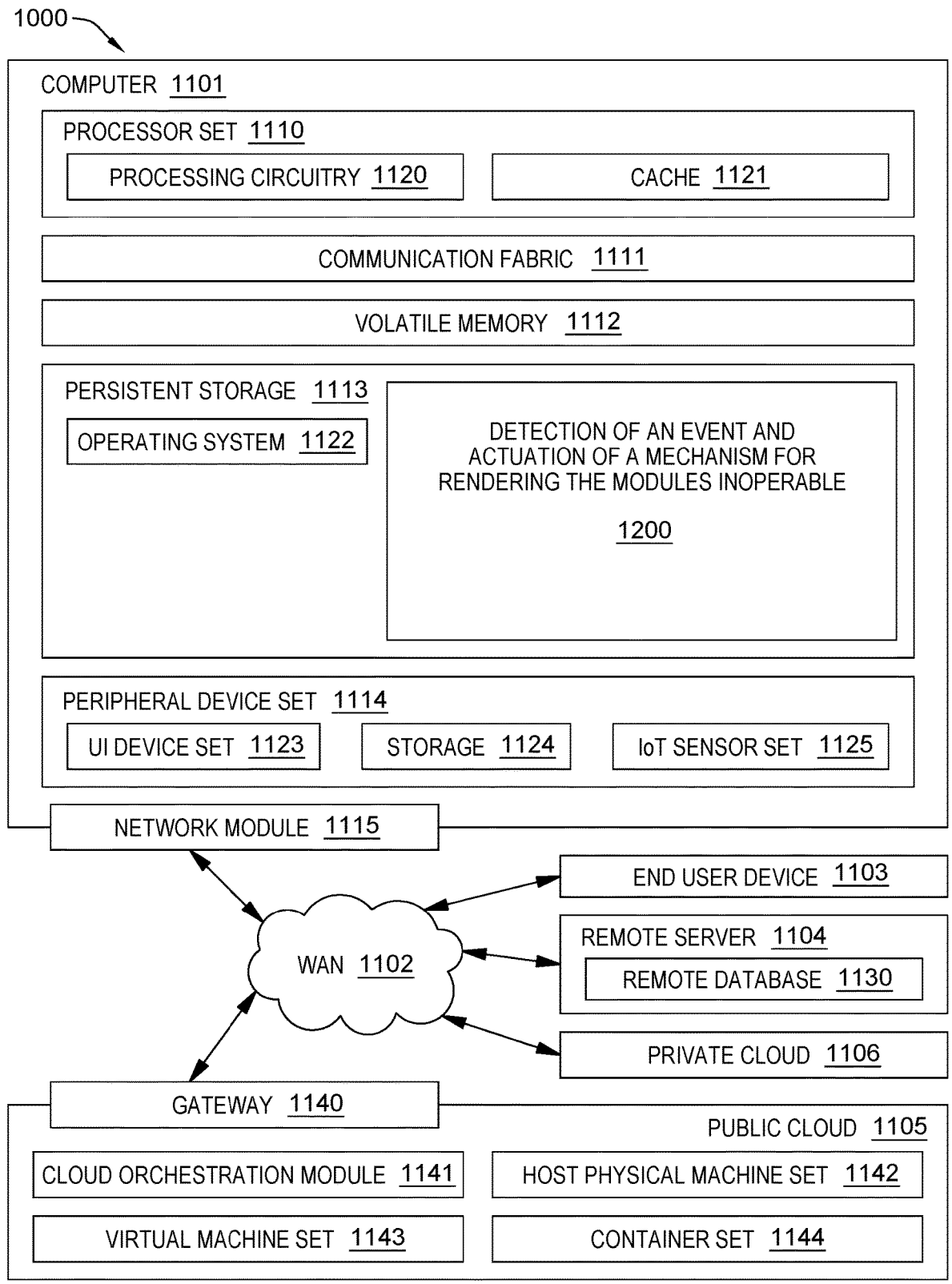
FIG. 5 is a schematic block diagram depicting a system according to an embodiment of the disclosure, which includes a computer system, and cloud computing components and functions, and the system can cooperate with the systems and methods shown in the figures and described herein.

Referring to FIGS. 2 and 3, according to an embodiment of the present disclosure, a computer implemented method 300 for bidding on digital or electronic advertising space associated with media content on a digital video platform and can include a system 200. The method 300 is one embodiment of a methodology for bidding on digital or electronic advertising space associated with media content on a digital video platform. A computer can include a computer readable storage medium on which is stored a program for executing by a processor, in all or in part, operations according to the present method, for example a remote computer 272 and/or a user computer 202 available to a user 210. The user computer 202 can include a computer readable storage medium 204 and a processor 206. In another example a computer as part of a service 221 can include a computer readable storage medium on which is stored a program for executing by a processor, operations according to the present method. For expediency the computer of the service is not shown in the figures, and it is understood that the remote computer 272 and/or the user computer 202, and/or the computer 1101 (see FIG. 5) and components therein can be used in a computer for the service 221.

The method 300 includes monitoring, using a computer 272, digital video platforms 214 for popularity of a plurality of videos 216 and associated video clips 218, as in operation 304.

The method includes determining or assessing, using the computer 272, a popularity of the plurality of videos and the associated video clips on one or more of the digital video platforms, in response to the monitoring of the digital video platform, as in operation 306.

The method 300 includes detecting, using the computer 272, a video clip of the plurality of video clips 218 meeting a threshold 230 for approaching an activity level 232 of user activity indicating the popularity of the video clip. For example, the activity level can include approaching or meeting an activity level which is a viral level. In one example, the detecting can include monitoring views per second of a video clip, traffic on a stream with respect to a video clip, or monitoring chat windows for chatter with respect to a video clip.

The method includes labeling, using the computer, the video clip meeting the threshold in operation 310, with a non-fungible token (NFT) indicating available digital advertising space associated with the video clip, as shown in operation 312. The method returns to operation 308 when the threshold is not met in operation 310.

The method includes receiving, in response to the labeling of the video clip, monetary bidding based on the NFT by entities buying digital advertising space for digital advertising content associated with the NFT, as in operation 314.

In one example, the method can further include awarding the digital advertising space associated with the video clip to a highest bidder of the entities bidding on the digital advertising space, as in operation 316.

In one example, the detecting can include monitoring traffic of a digital stream with respect to each of the video clips.

In one example, the detecting can include monitoring views by users of the video clips, respectively, for determining the activity level of the user activity.

In one example, the detecting can include monitoring on-line digital chat windows for determining the activity level of the user activity regarding the video clips, respectively.

In one example, the determining of the activity level can include the detecting of comments or selections of a link, by users, with respect to one of the video clips.

In one example, the method can further include defining ownership of the digital advertising space using the NFT.

Figure 4:
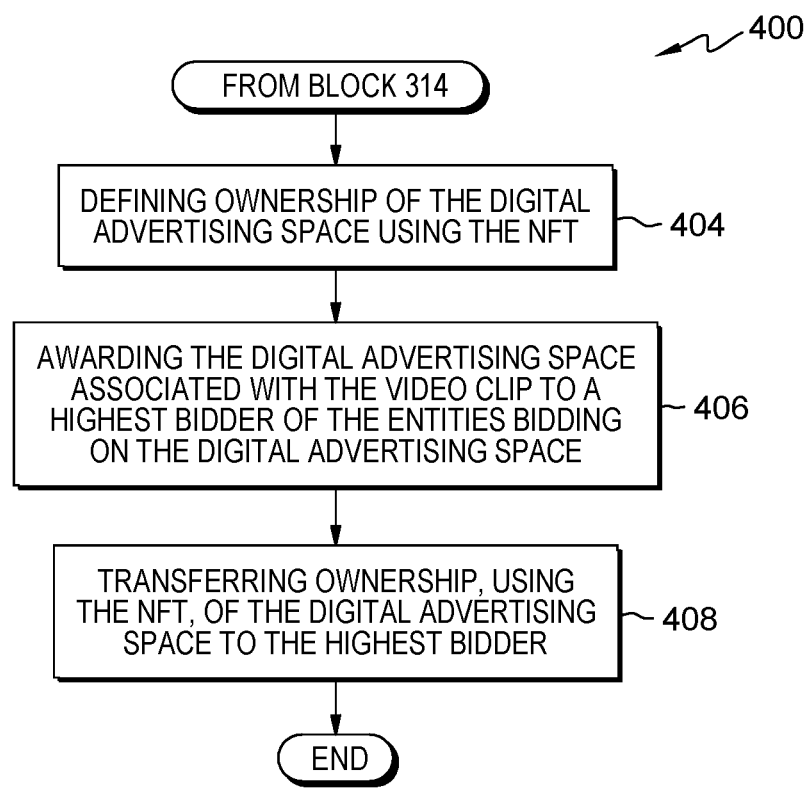
FIG. 4 is a flow chart illustrating another method according to an embodiment of the present invention, continuing from the method shown in FIG. 3.

Referring to FIG. 4, in one embodiment according to the present disclosure, a method 400 continues from operation 314 of the method 300 shown in FIG. 2. The method 400 includes defining ownership of the digital advertising space using the NFT, as in operation 404. The method includes awarding the digital advertising space associated with the video clip to a highest bidder of the entities bidding on the digital advertising space, as in operation 406. The method including transferring ownership, using the NFT, of the digital advertising space to the highest bidder, as in operation 408.

In another example, one or more methods can include defining ownership of the digital advertising space and the associated video clip using the NFT, and awarding the digital advertising space and the associated video clip to a highest bidder of the entities bidding on the digital advertising space. The method can include transferring ownership, using the NFT, of the digital advertising space and the associated video clip to the highest bidder.

Other Embodiments and Examples

A computer implemented method as disclosed herein can include modeling, using the computer. The model can be generated using a learning engine or modeling module of a computer system which can be all or in part of an Artificial Intelligence (AI) system which communicates with the computer and/or a control system. Such a computer system can include or communicate with a knowledge corpus or historical database. In one example, an acceptable model can include a model meeting specified parameters. In another example, an acceptable model can be a model which has undergone several iterations of modeling. When the model is not acceptable, the method can return to return to a previous operation or proceed as directed, for example as represented by a operational block in a flowchart.

In one example according to the present disclosure, a method can generate a model, using a computer, which can include a series of operations. The model can be generated using a learning engine or modeling module of a computer system which can be all or in part of an Artificial Intelligence (AI) system which communicates with a computer and/or a control system. Such a computer system can include or communicate with a knowledge corpus or historical database.

The model can be generated using a learning engine or modeling module of a computer system which can be all or in part of an Artificial Intelligence (AI) system which communicates with a computer and/or a control system. Such a computer system can include or communicate with a knowledge corpus or historical database. A model can also be generated by an AI system such as an output at least in part of an AI system analysis using machine learning.

Other Examples and Embodiments

In other embodiments and examples, in the present disclosure shown in the figures, a computer can be part of a remote computer or a remote server, for example, a remote server. In another example, the computer can be part of a control system and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs. A device(s), for example a mobile device or mobile phone, can belong to one or more users, and can be in communication with the control system via the communications network.

In other examples, a computer can be part of the mobile device, or a remote computer communicating with the mobile device. In another example, a mobile device and a remote computer can work in combination to implement the method of the present disclosure using stored program code or instructions to execute the features of the method(s)

described herein. In one example, the device can include a computer having a processor and a storage medium which stores an application, and the computer includes a display. The application can incorporate program instructions for executing the features of the present disclosure using the processor. In another example, the mobile device application or computer software can have program instructions executable for a front end of a software application incorporating the features of the method of the present disclosure in program instructions, while a back-end program or programs, of the software application, stored on the computer of the control system communicates with the mobile device computer and executes other features of the method. The control system and the device (e.g., mobile device or computer) can communicate using a communications network, for example, the Internet.

Methods and systems according to embodiments of the present disclosure, can be incorporated in one or more computer programs or an application stored on an electronic storage medium, and executable by the processor, as part of the computer on mobile device. For example, a mobile device can communicate with the control system, and in another example, a device such as a video feed device can communicate directly with the control system. Other users (not shown) may have similar mobile devices which communicate with the control system similarly. The application can be stored, all or in part, on a computer or a computer in a mobile device and at a control system communicating with the mobile device, for example, using the communications network, such as the Internet. It is envisioned that the application can access all or part of program instructions to implement the method of the present disclosure. The program or application can communicate with a remote computer system via a communications network (e.g., the Internet) and access data, and cooperate with program(s) stored on the remote computer system. Such interactions and mechanisms are described in further detail herein and referred to regarding components of a computer system, such as computer readable storage media, which are shown in one or more embodiments herein and described in more detail in regards thereto referring to one or more computers and systems described herein.

Also, referring to the figures, a device can include a computer, computer readable storage medium, and operating systems, and/or programs, and/or a software application, which can include program instructions executable using a processor. Embodiments of these features are shown herein in the figures. The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Referring to one or more embodiments in the figures, a computer or a device, also can be referred to as a user device or an administrator's device, includes a computer having a processor and a storage medium where an application can be stored. The application can embody the features of the method of the present disclosure as instructions. The user can connect to a learning engine using the device. The device which includes the computer and a display or monitor. The application can embody the method of the present disclosure and can be stored on the computer readable storage medium. The device can further include the processor for executing the application/software. The device can communicate with a communications network, e.g., the Internet.

It is understood that the user device is representative of similar devices which can be for other users, as representative of such devices, which can include, mobile devices, smart devices, laptop computers etc.

Additional Examples and Embodiments

In one example, a system according to the present disclosure can include a control system communicating with a user device via a communications network. The control system can incorporate all or part of an application or software for implementing the method of the present disclosure. The control system can include a computer readable storage medium where account data and/or registration data can be stored. User profiles can be part of the account data and stored on the storage medium. The control system can include a computer having computer readable storage medium and software programs stored therein. A processor can be used to execute or implement the instructions of the software program. The control system can also include a database.

A control system can include a storage medium for maintaining a registration of users and their devices for analysis of the audio input. Such registration can include user profiles, which can include user data supplied by the users in reference to registering and setting-up an account. In an embodiment, the method and system which incorporates the present disclosure includes the control system (generally referred to as the back end) in combination and cooperation with a front end of the method and system, which can be the application. In one example, the application is stored on a device, for example, a computer or device on location, and can access data and additional programs at a back end of the application, e.g., control system.

Referring to the figures, and for example, FIG. 2, a system 200 includes a computer 272 which can be integral to or communicating with a device and communicate with other computers such as computer 202. The computer 272 is remote from the computer 202 which can electronically communicate, in all or in part, with the control system computer 272 as part of a control system 270. The control system 270 can include the computer 272 which includes a computer readable storage medium 273 which can store one or more programs 274, and a processor 275 for executing program instructions, and can also include control software 278 for managing the one or more programs. The control system can also include a storage medium 280 which can include registration and/or account data 282 and user profiles 283 of users or entities (such entities can include robotic entities, or corporate entities) as part of user accounts 281. User accounts 281 can be stored on the storage medium 280 which is part of the control system 270. The user accounts 281 can include registrations and account data 282 and user profiles 283.

The control system can also include the computer 272 having a computer readable storage medium 273 which can store programs or code embedded on the storage medium. The program code can be executed by a processor 275. The computer 272 can communicate with a database 276. The control system 270 can also include a database 276 for storing all or part of such data as described above, and other data.

The control system 270 can also communicate with a computer or Artificial Intelligence (AI) system 290 which can include a learning engine/module 292 and a knowledge corpus or database 296. The learning engine 292 can include generating a model 293. The computer system 290 can also communicate with the computer 272. In another example, the computer system 290 can be all or part of the control system, or all or part of a device. The depiction of the computer system 290 as well as the other components of the system 200 are shown as one example according to the present disclosure. One or more computer systems can communicate with a communications network 220, e.g., the Internet. For example, the computer 290, and the control system 270 can communicate with the communications network 220, and the computer 202 can communicate with a local communications network which can communicate with the communications network 220.

Thus, in one example, a control system can be in communication with a computer or device, and the computer can include an application or software. The computer, or a computer in a mobile device can communicate with the control system using the communications network. In another example, the control system can have a front-end computer belonging to one or more users, and a back-end computer embodied as the control system.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, which may be shown, for example, in the example figures, for instance an application stored on a computer readable storage medium of a computer or device. The application is stored on the device or computer and can access data and additional programs at the back end of the application, for example, in the program(s) stored in the control system.

The program(s) can include all or in part, a series of executable steps for implementing the method of the present disclosure. A program, incorporating the present method, can be all or in part stored in the computer readable storage medium on the control system or, in all or in part, on a computer or device. It is envisioned that the control system can not only store the profile of users, but in one embodiment, can interact with a website for viewing on a display of a device such as a mobile device, or in another example the Internet, and receive user input related to the method and system of the present disclosure. It is understood that embodiments shown in the figures depicts one or more profiles, however, the method can include multiple profiles, users, registrations, etc. It is envisioned that a plurality of users or a group of users can register and provide profiles using the control system for use according to the method and system of the present disclosure.

In one example, received data can include data in a knowledge corpus and historical database, which can be populated by historical data gathered, for example, from sensors, robotic device, or other machines or devices.

Still Further Embodiments and Examples

Account data, for instance, including profile data related to a user, and any data, personal or otherwise, can be collected and stored, for example, in a control system. It is understood that such data collection is done with the knowledge and consent of a user, and stored to preserve privacy, which is discussed in more detail below. Such data can include personal data, and data regarding personal items.

In one example a user can register and have an account with a user profile on a control system. For example, data can be collected using techniques as discussed above, for example, using cameras, and data can be uploaded to a user profile by the user. A user can include, for example, a corporate entity, or department of a business, or a homeowner, or any end user, a human operator, or a robotic device, or other personnel of a business.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

Other Additional Embodiments and Examples

In one example, Artificial Intelligence (AI) can be used, all or in part, for generating a model or a learning model as discussed herein in embodiments of the present disclosure. An Artificial Intelligence (AI) System can include machines, computer, and computer programs which are designed to be intelligent or mirror intelligence. Such systems can include computers executing algorithms. AI can include machine learning and deep learning. For example, deep learning can include neural networks. An AI system can be cloud based, that is, using a cloud-based computing environment having computing resources. In another example, a control system can be all or part of an Artificial Intelligence (AI) system. For example, the control system can be one or more components of an AI system.

It is also understood that methods and systems according to embodiments of the present disclosure, can be incorporated into (Artificial Intelligence) AI devices, components or be part of an AI system, which can communicate with respective AI systems and components, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

More Examples and Embodiments

Additionally, methods and systems according to embodiments of the present disclosure can be discussed in relation to a functional system(s) depicted by functional block diagrams. The methods and systems can include components and operations for embodiments according to the present disclosure and is used herein for reference when describing the operational steps of the methods and systems of the present disclosure. Additionally, the functional system, according to an embodiment of the present disclosure, depicts functional operations indicative of the embodiments discussed herein.

The methods and systems of the present disclosure can include a series of operational blocks for implementing one or more embodiments according to the present disclosure. A method shown in the figures may be another example embodiment, which can include aspects/operations shown in another figure and discussed previously, but can be reintroduced in another example. Thus, operational blocks and system components shown in one or more of the figures may be similar to operational blocks and system components in other figures. The diversity of operational blocks and system components depict example embodiments and aspects according to the present disclosure. For example, methods shown are intended as example embodiments which can include aspects/operations shown and discussed previously in the present disclosure, and in one example, continuing from a previous method shown in another flow chart.

It is understood that the features shown in some of the figures, for example block diagrams, are functional representations of features of the present disclosure. Such features are shown in embodiments of the systems and methods of the present disclosure for illustrative purposes to clarify the functionality of features of the present disclosure.

Further Discussion Regarding Examples and Embodiments

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants.

The descriptions of the various embodiments of the present invention have been presented for purposes of illustration but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is also understood that the one or more computers or computer systems shown in the figures can include all or part of a computing environment and its components shown in another figure, for example, the computing environment 1000 can be incorporated, in all or in part, in one or more computers or devices shown in other figures and described herein. In one example, the one or more computers can communicate with all or part of a computing environment and its components as a remote computer system to achieve computer functions described in the present disclosure.

More Additional Examples and Embodiments

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 7, a computing environment 1000 contains an example of an environment for the execution of at least some of the computer code involved in performing the inventive methods, such as detection of an event, such as a breach of the pressurized housing, and actuation of a device or mechanism for rendering modules inoperable, such as damaging memory modules to render them inoperable 1200. In addition to block 1200, computing environment 1000 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1200, as identified above), peripheral device set 1114 (including user interface (UI), device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 7. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1200 in persistent storage 1113.

COMMUNICATION FABRIC 1111 is the signal conduction paths that allow the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, the volatile memory is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

What is claimed is:

1. A computer implemented method for bidding on digital advertising space associated with media content on a digital platform, comprising:
    determining, using a computer, popularity of a plurality of electronic communications and associated clips of the electronic communications on a digital platform, in response to monitoring the digital platform;
    detecting, using the computer, a clip of the associated clips meeting a threshold for approaching an activity level of user activity indicating the popularity of the clip;
    labeling, using the computer, the clip meeting the threshold with a non-fungible token (NFT) indicating available digital advertising space associated with the clip;
    receiving, in response to the labeling of the clip, monetary bidding based on the NFT by entities buying digital advertising space of the available digital advertising space associated with the clip for digital advertising content associated with the NFT which indicates available digital advertising space associated with the clip;
    defining ownership of the digital advertising space using the NFT;
    awarding ownership of the digital advertising space associated with the clip to a highest bidder of the entities bidding on the digital advertising space; and
    transferring ownership, using the NFT, of the digital advertising space to the highest bidder.

2. The method of claim 1, further comprising:
    awarding the digital advertising space associated with the clip to a highest bidder of the entities bidding on the digital advertising space.

3. The method of claim 1, wherein the detecting including monitoring traffic of a digital stream with respect to each of the clips.

4. The method of claim 1, wherein the detecting including monitoring views by users of the clips, respectively, for determining the activity level of the user activity.

5. The method of claim 1, wherein the detecting including monitoring on-line digital chat windows for determining the activity level of the user activity regarding the clips, respectively.

6. The method of claim 1, wherein determining of the activity level includes the detecting of comments or selections of a link, by users, with respect to one of the clips.

7. The method of claim 1, further comprising:
    defining ownership of the digital advertising space using the NFT.

8. The method of claim 1, further comprising:
    defining ownership of the digital advertising space and the associated clip using the NFT;
    awarding the digital advertising space and the associated clip to a highest bidder of the entities bidding on the digital advertising space; and
    transferring ownership, using the NFT, of the digital advertising space and the associated clip to the highest bidder.

9. The method of claim 1, wherein the electronic communications are videos with or without audio, or audio recordings.

10. The method of claim 1, wherein the electronic communications are videos with or without audio, or audio recordings, and the associated clips are associated video clips, or associated audio clips.

11. The method of claim 1, wherein the digital platform includes a digital video and audio platform.

12. A system for bidding on digital advertising space associated with media content on a digital platform, which comprises:
    a computer system comprising; a computer processor, a computer-readable storage medium, and program instructions stored on the computer-readable storage medium being executable by the processor, to cause the computer system to perform the following functions to;
    determine, using a computer, popularity of a plurality of electronic communications and associated clips of the electronic communications on a digital platform, in response to monitoring the digital video platform;
    detect, using the computer, a clip of the associated clips meeting a threshold for approaching an activity level of user activity indicating the popularity of the clip;
    label, using the computer, the clip meeting the threshold with a non-fungible token (NFT) indicating available digital advertising space associated with the clip; [and] receive, in response to the labeling of the clip, monetary bidding based on the NFT by entities buying digital advertising space of the available digital advertising space associated with the clip for digital advertising content associated with the NFT which indicates available digital advertising space associated with the clip;
    define ownership of the digital advertising space using the NFT;
    award ownership of the digital advertising space associated with the clip to a highest bidder of the entities bidding on the digital advertising space; and
    transfer ownership, using the NFT, of the digital advertising space to the highest bidder.

13. The system of claim 12, further comprising the function to:
    award the digital advertising space associated with the clip to a highest bidder of the entities bidding on the digital advertising space.

14. The system of claim 12, wherein the detection includes monitoring traffic of a digital stream with respect to each of the clips.

15. The system of claim 12, wherein the detection includes monitoring views by users of the clips, respectively, for determining the activity level of the user activity.

16. The system of claim 12, wherein the detection includes monitoring on-line digital chat windows for determining the activity level of the user activity regarding the clips, respectively.

17. The system of claim 12, wherein the determination of the activity level includes the detecting of comments or selections of a link, by users, with respect to one of the clips.

18. The system of claim 12, further comprising the function to:
    define ownership of the digital advertising space using the NFT.

19. A computer program product for bidding on digital advertising space associated with media content on a digital platform, the computer program product comprising a computer readable storage medium having program instructions embodied therewith, the program instructions executable by a computer to cause the computer to perform functions, by the computer, comprising the functions to;
- determine, using a computer, popularity of a plurality of electronic communications and associated clips of the electronic communications on a digital platform, in response to monitoring the digital platform;
- detect, using the computer, a clip of the associated clips meeting a threshold for approaching an activity level of user activity indicating the popularity of the clip;
- label, using the computer, the clip meeting the threshold with a non-fungible token (NFT) indicating available digital advertising space associated with the clip;
- receive, in response to the labeling of the clip, monetary bidding based on the NFT by entities buying digital advertising space of the available digital advertising space associated with the clip for digital advertising content associated with the NFT which indicates available digital advertising space associated with the clip;
- define ownership of the digital advertising space using the NFT;
- award ownership of the digital advertising space associated with the clip to a highest bidder of the entities bidding on the digital advertising space; and
- transfer ownership, using the NFT, of the digital advertising space to the highest bidder.

* * * * *